(12) United States Patent
Wang et al.

(10) Patent No.: US 7,444,451 B2
(45) Date of Patent: Oct. 28, 2008

(54) ADAPTIVE INTERRUPTS COALESCING SYSTEM WITH RECOGNIZING MINIMUM DELAY PACKETS

(75) Inventors: Wen-Fong Wang, Hsinchu (TW); Jun-Yao Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 135 days.

(21) Appl. No.: 11/488,000

(22) Filed: Jul. 18, 2006

(65) Prior Publication Data

US 2007/0143513 A1 Jun. 21, 2007

(30) Foreign Application Priority Data

Dec. 16, 2005 (TW) ............................... 94144939 A

(51) Int. Cl.
*G06F 13/24* (2006.01)
(52) U.S. Cl. ...................................... 710/266; 710/263
(58) Field of Classification Search ......... 710/260–266, 710/268
See application file for complete search history.

(56) References Cited

U.S. PATENT DOCUMENTS

| | | | |
|---|---|---|---|
| 6,065,089 A | 5/2000 | Hickerson et al. | |
| 6,351,785 B1 * | 2/2002 | Chen et al. | 710/263 |
| 6,427,169 B1 * | 7/2002 | Elzur | 709/224 |
| 7,054,972 B2 * | 5/2006 | Parry et al. | 710/260 |
| 7,103,693 B2 * | 9/2006 | Anand et al. | 710/260 |
| 2004/0236875 A1 * | 11/2004 | Jinzaki | 710/15 |

OTHER PUBLICATIONS

Interrupt Coalescing, ibm.com, undated.*

Estimating the Impact of Interrupt Coalescing Delays on Steady State TCP Troughput, Zec et al., 2002.*
Wen-fong Wang, et al. "Study on Enhanced Strategies for CIP/IP Offload Engines" Proceedings of the 11th International Conference on Parallel and Distributed System, vol. 1.
Voruganti, Kaladhar et al., "An Analysis of Three Gigabit Networking Protocols for Storage Area Networks," IEEE International Conference on Performance, Computing, and Communications, Apr. 2001, p. 259-265.
Shaikh, A., et al. "Traffic Characteristics of bulk data transfer using TCP/IP overgigabit Ethernet", IEEE International Conference on Performance, Computing, and Communications, Apr. 2001, p. 103-111.

* cited by examiner

Primary Examiner—Khanh Dang
(74) Attorney, Agent, or Firm—Volentine & Whitt, PLLC

(57) ABSTRACT

The present invention relates to an adaptive interrupts coalescing system with recognizing minimum delay packets. The adaptive interrupts coalescing system of the invention comprises a first calculating device, a packet header parser, a second calculating device, and an interrupt controller. The first calculating device is used for calculating packet information of a plurality of packets. The packet header parser is used for recognizing the type of service field in each packet and for generating a minimum delay control signal. The second calculating device is used for determining a coalescing interrupt number signal according to the packet information and the minimum delay control signal. The interrupt controller is used for transmitting an interrupt control signal to process the packet according to the coalescing interrupt number signal. The system of the invention can process the minimum delay packet in a minimum delay time so as to reduce the delay time of the minimum delay packet and the average delay time of the packets and to avoid the miss owing to the delay of the packet.

9 Claims, 3 Drawing Sheets

ADAPTIVE INTERRUPTS COALESCING SYSTEM WITH RECOGNIZING MINIMUM DELAY PACKETS

BACKGROUND OF THE INVENTION

1. Field of the Invention

The invention relates to an adaptive interrupts coalescing system, particularly to an adaptive interrupts coalescing system with recognizing minimum delay packets.

2. Description of the Related Art

Referring to FIG. 1, it shows a conventional adaptive interrupts coalescing system. The conventional adaptive interrupts coalescing system 10 comprises a first calculating device 11, a timer 12, a second calculating device 13 and an interrupt controller 14. The first calculating device 11 is used for calculating packet information of a plurality of packets. The packet information of the packets comprise an amount of receiving data, an amount of transmitting data and an amount of total data of the packets, wherein the amount of total data is calculated according to the amount of receiving data and the amount of transmitting data. For example: the amount of total data=a×the amount of receiving data+b×the amount of transmitting data.

The timer 12 is used for providing a time signal to the second calculating device 13; for example, the timer 12 provides a time interval to the second calculating device 13. The second calculating device 13 is used for determining a coalescing interrupt number signal according to the packet information and the time interval. According to the coalescing interrupt number signal, the interrupt controller 14 transmits an interrupt control signal to a processor to process the packets so as to interrupt the coalescing processing when the amount of the packets is equal to the coalescing interrupt number.

Particularly, if the amount of total data is larger than a high threshold limit value, the coalescing interrupt number signal is determined to be a high coalescing interrupt number value (for example 40), i.e., if the amount of the packets is equal to the high coalescing interrupt number value, the interrupt controller 14 transmits an interrupt control signal to process 40 packets in coalesce. If the amount of total data of the packets is smaller than a high threshold limit value and larger than a low threshold limit value, the coalescing interrupt number signal is determined to be a middle coalescing interrupt number value (for example 15), i.e., if the amount of the packets is equal to the middle coalescing interrupt number value, the interrupt controller 14 transmits an interrupt control signal to process 15 packets in coalesce.

Similarly, if the amount of total data is smaller than a low threshold limit value, the coalescing interrupt number signal is determined to be a low coalescing interrupt number value (for example 5), i.e., if the amount of the packets is equal to the low coalescing interrupt number value, the interrupt controller 14 transmits an interrupt control signal to process 5 packets in coalesce.

Therefore, the conventional adaptive interrupts coalescing system 10 adjusts different coalescing interrupt numbers to interrupt coalescing processing according to the amount of data. However, some types of service field (TOS) is minimum delay, i.e., the packets of minimum delay must be processed immediately. In the conventional adaptive interrupts coalescing system 10, the packets of minimum delay will be processed in coalesce with other packets until the amount of packets is equal to the coalescing interrupt number. Therefore, the packets of minimum delay will cause unpredictable delay time so the average delay time is increased.

Consequently, there is an existing need for an adaptive interrupts coalescing system to solve the above-mentioned problem.

SUMMARY OF THE INVENTION

One objective of the present invention is to provide an adaptive interrupts coalescing system with recognizing minimum delay packets. The adaptive interrupts coalescing system of the invention comprises a first calculating device, a packet header parser, a second calculating device, and an interrupt controller. The first calculating device is used for calculating packet information of a plurality of packets. The packet header parser is used for recognizing the type of service field in each packet and for generating a minimum delay control signal. The second calculating device is used for determining a coalescing interrupt number signal according to the packet information and the minimum delay control signal. The interrupt controller is used for transmitting an interrupt control signal to process the packet according to the coalescing interrupt number signal.

The system of the invention can recognize whether the type of service field in each packet is minimum delay and can process the minimum delay packet in a minimum delay time so as to reduce the delay time of the minimum delay packet and the average delay time of the packets and to avoid the miss owing to the delay of the packet.

DETAILED DESCRIPTION OF THE INVENTION

Figure 1:
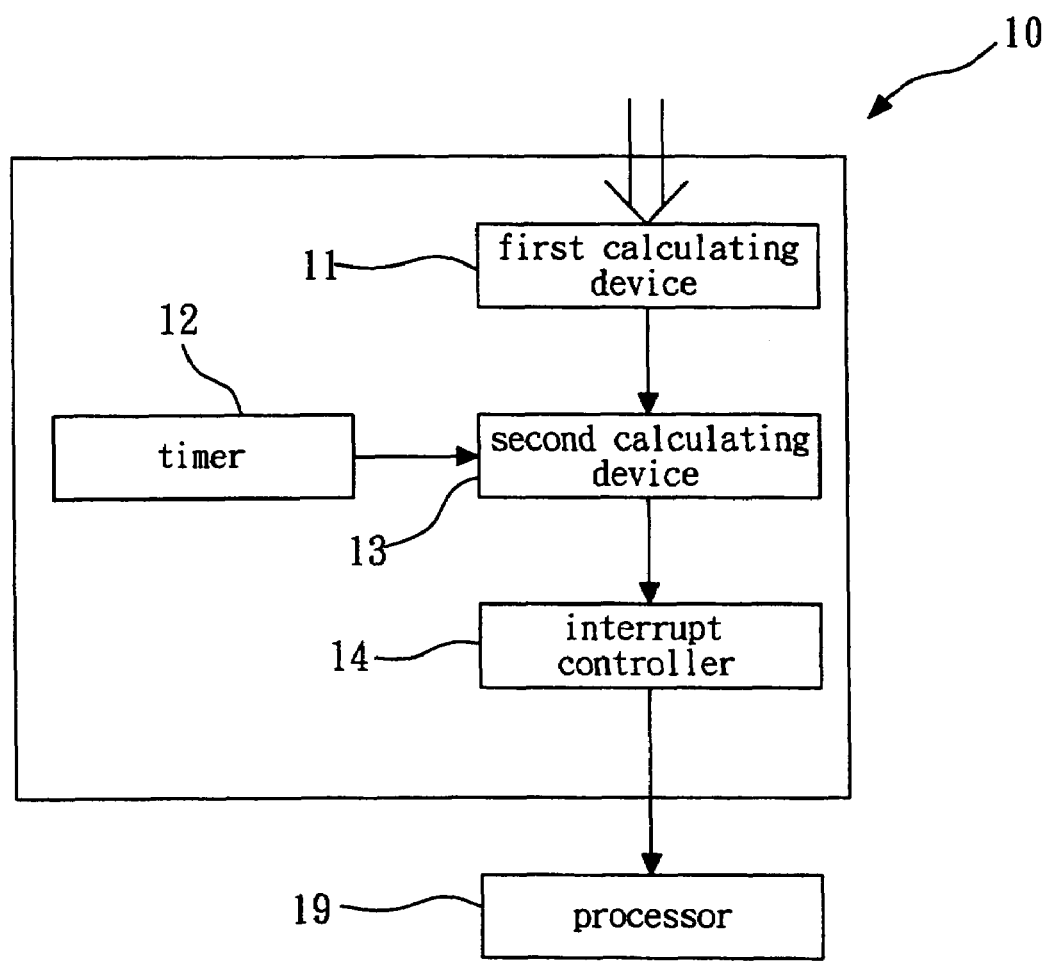
FIG. 1 shows a conventional adaptive interrupts coalescing system.
Figure 2:
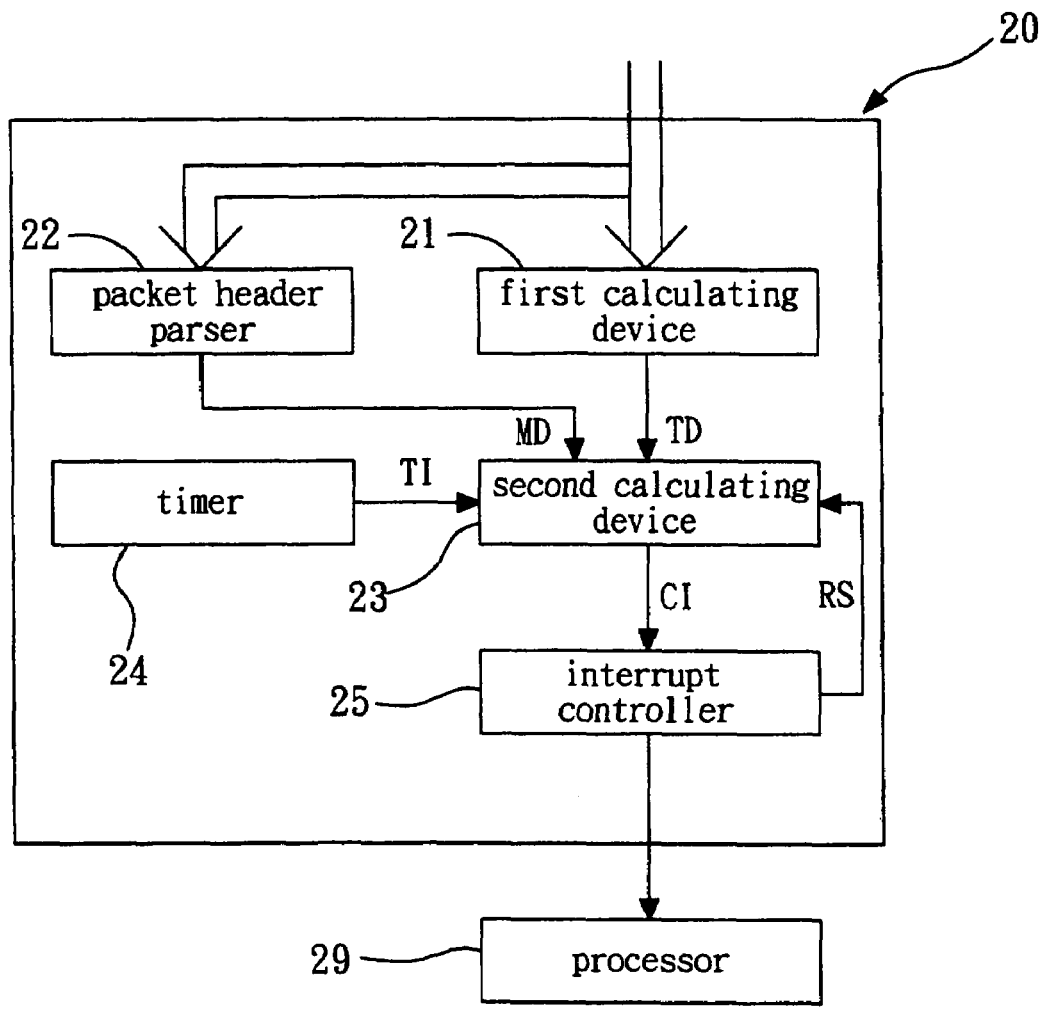
FIG. 2 shows an adaptive interrupts coalescing system with recognizing minimum delay packets according to the present invention.

Referring to FIG. 2, it shows an adaptive interrupts coalescing system with recognizing minimum delay packets according to the present invention. The adaptive interrupts coalescing system 20 of the invention comprises a first calculating device 21, a packet header parser 22, a second calculating device 23, a timer 24 and an interrupt controller 25. The first calculating device 21 is used for calculating packet information of a plurality of packets. The packet information of the packets comprise an amount of receiving data, an amount of transmitting data and an amount of total data of the packets, wherein the amount of total data is calculated according to the amount of receiving data and the amount of transmitting data. For example: the amount of total data=a×the amount of receiving data+b×the amount of transmitting data. After the first calculating device 21 calculates the packet information of the packets (for example, amount of total data TD), the packet information of the packets are transmitted to the second calculating device 23.

The packet header parser 22 is used for recognizing the type of service field in each packet and for generating a minimum delay control signal. Each packet has a type of service (TOS) field, and the type of service field has four bits, wherein 0000 represents for normal service, 0001 represents for minimal monetary cost, 0010 represents for maximal reliability, 0100 represents for maximal throughput and 1000 represents for minimal delay.

Therefore, when the type of service field is 1000, the packets have minimum delay, i.e., the packets of minimum delay must be processed immediately. Thus, the packet header parser 22 is used for recognizing whether the type of service field in each packet is minimum delay value (1000), and the low delay control signal (MD) is transmitted to the second calculating device 23.

The timer 24 is used for providing a time signal to the second calculating device 23; for example, the timer 24 provides a time interval to the second calculating device 23. The second calculating device 23 is used for determining a coalescing interrupt number signal (CI) according to the packet information (TD) and the low delay control signal (MD). The interrupt controller 25 is used for transmitting an interrupt control signal to a processor so as to process the packets according to the coalescing interrupt number signal.

Figure 3:
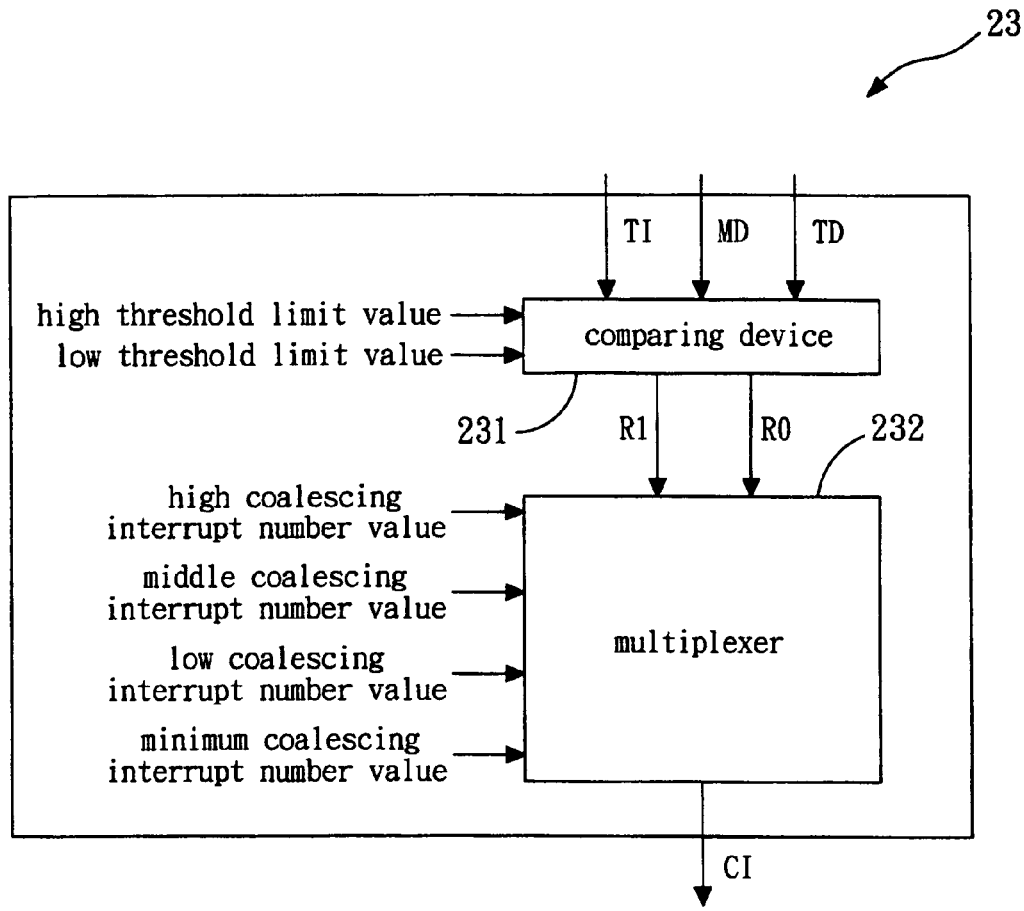
FIG. 3 shows a second calculating device of the present invention.

Referring to FIG. 3, it shows a second calculating device of the present invention. The second calculating device 23 comprises a comparing device 231 and a multiplexer 232. The comparing device 231 is used for generating a plurality of selection signals (for example R1 and R0) according to the packet information, the minimum delay control signal, the time signal, a high threshold limit value and a low threshold limit value. According to the selection signals, the multiplexer 232 selects one of a high coalescing interrupt number value (for example 40), a middle coalescing interrupt number value (for example 15), a low coalescing interrupt number value (for example 5) and a minimum coalescing interrupt number value (for example 1) as the coalescing interrupt number signal.

In detail, the comparing device 231 is used for comparing the amount of total data (TD) of the packets with the high threshold limit value or the low threshold limit value. If the amount of total data is larger than the high threshold limit value, the amount of data is in high quantity at that time and the selection signals (R1 and R0) are set to be 00. The coalescing interrupt number signal is set to be the high coalescing interrupt number value (for example 40) by the multiplexer 232 according to the selection signals. Therefore, the interrupt controller 25 transmits an interrupt control signal to process the packets when the amount of packets is equal to the high coalescing interrupt number value (40).

If the amount of total data is smaller than the high threshold limit value and the type of service field is not the minimum delay value, the amount of data is in middle quantity at that time and the selection signals (R1 and R0) are set to be 01. The coalescing interrupt number signal is set to be the middle coalescing interrupt number value (for example 15) by the multiplexer 232 according to the selection signals. Therefore, the interrupt controller 25 transmits an interrupt control signal to process the packets when the amount of packets is equal to the middle coalescing interrupt number value (15).

If the amount of total data is smaller than the low threshold limit value and if the type of service field is not the minimum delay value, the amount of data is in low quantity at that time and the selection signals (R1 and R0) are set to be 10. The coalescing interrupt number signal is set to be the low coalescing interrupt number value (for example 5) by the multiplexer 232 according to the selection signals. Therefore, the interrupt controller 25 transmits an interrupt control signal to process the packets when the amount of packets is equal to the low coalescing interrupt number value (5).

If the amount of total data is smaller than the high threshold limit value and if the type of service field is the minimum delay value, the present packets must be processed immediately and the selection signals (R1 and R0) are set to be 11. The coalescing interrupt number signal is set to be the minimum coalescing interrupt number value (for example 1) by the multiplexer 232 according to the selection signals. Therefore, the interrupt controller 25 transmits an interrupt control signal to process the packets when the amount of packets is equal to the minimum coalescing interrupt number value (1). Therefore, the packets before the packet with the low delay value are immediately processed until the packet with the low delay value is processed. Since the packet with the low delay value is immediately processed and is not necessary to be processed with other packets in together after reaching a predetermined numbers of packets so as to reduce the delay time of the packets and to avoid the miss owing to the delay of the packet.

After the interrupt controller 25 transmits the interrupt controller signal to the processor 29 and the packet with the minimum delay value in the type of service field is processed, the interrupt controller 25 transmits a reset signal (RS) to the second calculating device 23. In the time interval, the other packets behind the packet with the minimum delay value must still be recognized according to the above-mentioned comparison so as to determine the coalescing interrupt number signal. The minimum coalescing interrupt number value is not directly used as the coalescing interrupt number signal in the time interval.

When the amount of total data is large, the amount of packets can quickly be equal to the coalescing interrupt number value, the packets will be processed quickly. By experiment, there are few effects no matter whether the type of service field in each packet is further recognized to be the minimum delay value or not when the amount of total data is large. Therefore, in the above embodiment, the type of service field in each packet is further recognized to be the minimum delay value when the amount of total data is middle or less. However, when the amount of total data is large, the adaptive interrupts coalescing system of the invention can also recognize whether the type of service field in each packet is to be the minimum delay value and can process the packets with the minimum delay immediately.

The system of the invention can recognize whether the type of service field in each packet is minimum delay and can process the minimum delay packet in a minimum delay time so as to reduce the delay time of the minimum delay packet and the average delay time of the packets and to avoid the miss owing to the delay of the packet.

While the embodiment has been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. An adaptive interrupts coalescing system with recognizing minimum delay packets, comprising:
   a first calculating device, for calculating packet information of a plurality of packets;
   a packet header parser, for recognizing the type of service field in each packet and for generating a minimum delay control signal;
   a second calculating device, operatively connected to the first calculating device and the packet header parser, for determining a coalescing interrupt number signal according to the packet information calculated by the first calculating device and the minimum delay control signal generated by the packet header parser;

an interrupt controller, operatively connected to the second calculating device, for transmitting an interrupt control signal to process the packet according to the coalescing interrupt number signal determined by the second calculating device, wherein the second calculating device comprises:

a comparing device, for generating a plurality of selection signals according to the packet information, the minimum delay control signal, a time signal, a high threshold limit value and a low threshold limit value; and a multiplexer, for selecting one of a high coalescing interrupt number value, a middle coalescing interrupt number value, a low coalescing interrupt number value and a minimum coalescing interrupt number value as the coalescing interrupt number signal according to the selection signals generated by the comparing device.

2. The adaptive interrupts coalescing system according to claim 1, wherein the packet header parser is used to recognize whether the type of service field in each packet is a minimum delay value.

3. The adaptive interrupts coalescing system according to claim 2, wherein the first calculating device is used for calculating an amount of receiving data, an amount of transmitting data and an amount of total data of the packets, wherein the amount of total data is calculated according to the amount of receiving data and the amount of transmitting data.

4. The adaptive interrupts coalescing system according to claim 3, further comprising a timer for providing the time signal to the second calculating device.

5. The adaptive interrupts coalescing system according to claim 1, wherein the comparing device is used for comparing the amount of total data of the packets with the high threshold limit value or the low threshold limit value, and the coalescing interrupt number signal is determined to be the high coalescing interrupt number value if the amount of total data is larger than the high threshold limit value.

6. The adaptive interrupts coalescing system with recognizing minimum delay packets according to claim 1, wherein the coalescing interrupt number signal is determined to be the middle coalescing interrupt number value if the amount of total data is smaller than the high threshold limit value and larger than the low threshold limit value and the type of service field is not the minimum delay value.

7. The adaptive interrupts coalescing system according to claim 1, wherein the coalescing interrupt number signal is determined to be the low coalescing interrupt number value if the amount of total data is smaller than the low threshold limit value and the type of service field is not the minimum delay value.

8. The adaptive interrupts coalescing system according to claim 1, wherein the coalescing interrupt number signal is determined to be the minimum coalescing interrupt number value if the amount of total data is smaller than the high threshold limit value and the type of service field is the minimum delay value.

9. The adaptive interrupts coalescing system according to claim 8, wherein the interrupt controller transmits a reset signal to the second calculating device after the packet with the minimum delay value in the type of service field is processed.

* * * * *